May 9, 1939.  S. STRATY  2,157,357
ALLOY-LINED TUBULAR CONNECTION FOR VESSELS
Filed May 15, 1936
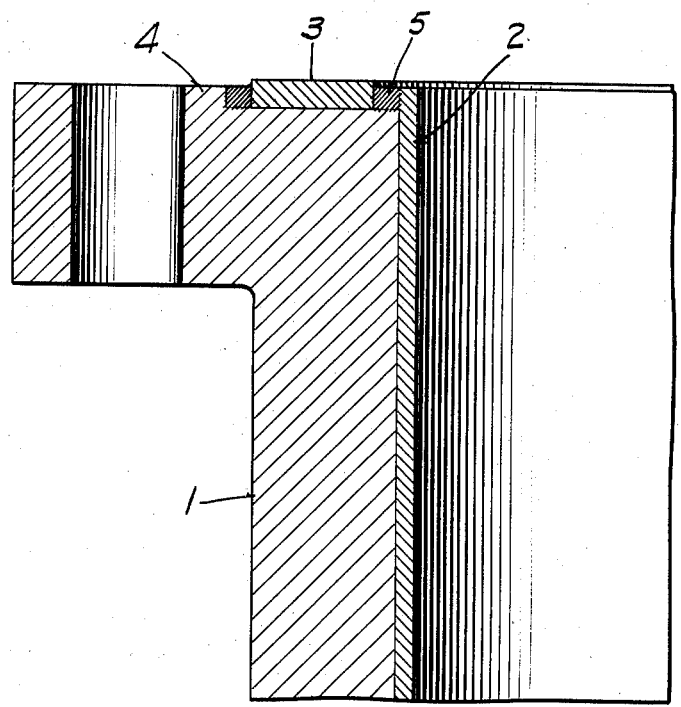
INVENTOR.
Stephen Straty
BY
ATTORNEY.

Patented May 9, 1939

2,157,357

UNITED STATES PATENT OFFICE 2,157,357

ALLOY-LINED TUBULAR CONNECTION FOR VESSELS

Stephen Straty, Milwaukee, Wis., assignor to A. O. Smith Corporation, Milwaukee, Wis., a corporation of New York Application May 15, 1936, Serial No. 79,936

2 Claims. (Cl. 220—63)

The invention relates to an alloy-lined tubular connection for vessels and has particular reference to an alloy-lined nozzle or manway connection for pressure vessels used in the oil refining and chemical industries.

The object of the invention is to provide a lined tubular connection for a vessel or tank in which the lining is of alloy sheet and extends continuously for the full length of the connection, presenting uniform corrosion-resisting properties throughout.

An embodiment of the invention is illustrated in the accompanying drawing in which the figure shows a broken longitudinal section through one end of the tubular connection.

The wall 1 of the flanged tubular connection has attached to it on the inside an alloy sheet liner 2 of suitable composition to resist corrosion from the fluid contents of the vessel in service. The cylindrical or tubular liner 2 extends for the full length of the wall 1, and at the outer end the liner 2 extends beyond a recess in the end of the wall 1.

An alloy ring plate 3 is fitted on the flange 4 at the end of the wall 1 to provide a seat against which a tubular connection may be secured in a fluid-tight seal. The inner diameter of the ring 3 is greater than the outer diameter of the liner 2 so as to provide therebetween a welding groove into which alloy weld metal 5 is deposited to weld the wall 1, liner 2 and ring plate 3 together.

It is preferable also to weld the plate 3 to the flange 4 at the outer circumference of the plate.

The construction provided by the invention has a smooth continuous sheet alloy lining and the circumferential weld deposit 5 is not exposed to direct contact with the flowing fluid.

The invention is claimed as follows:

1. An alloy-lined tubular connection comprising a tubular part of a composition tending to corrode in service and having a recess at one end near its inner circumference for receiving an alloy seat, a continuous tubular alloy lining secured in said part and extending beyond the recessed end of the part a predetermined distance, an alloy ring plate disposed in said recess and forming a seat at the end of the tubular connection for providing a fluid-tight joint, said plate being substantially concentric with said liner and spaced radially therefrom and having its outer surface extending beyond the end of said tubular part a predetermined distance, and alloy weld metal deposited in the radial space thus provided and welding the tubular part, the liner and the ring plate together.

2. An alloy-lined tubular connection comprising a flanged tubular part of a composition tending to corrode in service and having its flanged end recessed at the inner circumference to receive an alloy seat, a continuous tubular alloy lining secured in said part and extending beyond the recessed end of the part a predetermined distance, an alloy ring plate disposed in said recess and welded at its outer circumference to the end of said part, said plate extending beyond the end of said part a predetermined distance to form a seat at the flanged end of the tubular connection for providing a fluid-tight joint and being substantially concentric with said liner and spaced radially therefrom, and alloy weld metal deposited in the radial space thus provided and welding the tubular part, the liner and the ring plate together.

STEPHEN STRATY.